United States Patent
Nelson, Jr. et al.

(10) Patent No.: US 6,545,994 B2
(45) Date of Patent: Apr. 8, 2003

(54) ACCESS PROBE ACKNOWLEDGMENT INCLUDING COLLISION DETECTION TO AVOID OVERSETTING INITIAL POWER LEVEL

(75) Inventors: George R. Nelson, Jr., Merritt Island, FL (US); James A. Proctor, Jr., Indialantic, FL (US); John E. Hoffmann, Indialantic, FL (US); Antoine J. Rouphael, Escondido, CA (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/792,410

(22) Filed: Feb. 23, 2001

(65) Prior Publication Data

US 2001/0033579 A1 Oct. 25, 2001

Related U.S. Application Data

(60) Provisional application No. 60/184,223, filed on Feb. 23, 2000.

(51) Int. Cl.[7] .................. H04B 7/212; H04B 7/216; H04Q 7/20
(52) U.S. Cl. .................. 370/337; 370/345; 370/347; 370/441; 455/452; 455/522; 714/36; 714/750
(58) Field of Search ........................ 370/335, 342, 370/337, 347, 349, 445, 441, 345, 352, 449, 401; 714/36, 39, 52, 748, 750, 784; 455/522, 516, 517, 509, 452; 340/825.24

(56) References Cited

U.S. PATENT DOCUMENTS 5,056,109 A 10/1991 Gilhousen et al. ............. 375/1
5,130,983 A * 7/1992 Heffner, III ................. 370/449
5,257,283 A 10/1993 Gilhousen et al. ............. 375/1

(List continued on next page.)

FOREIGN PATENT DOCUMENTS

EP 0 773 636 A 5/1997
EP 0 910 176 A 4/1999

OTHER PUBLICATIONS

Yang, Samuel C., "Principles of Code Division Multiple Access," In *CDMA RF System Engineering*, (MA: Artech House, Inc.) Ch. 4, pp. 75–103 (1998).

Primary Examiner—Alpus H. Hsu
Assistant Examiner—Afsar M. Qureshi
(74) Attorney, Agent, or Firm—Hamilton, Brook, Smith & Reynolds, P.C.

(57) ABSTRACT

In an illustrative embodiment of the present invention, a first channel is allocated for transmitting sporadically generated messages from multiple field units to a base station. The first channel is preferably divided into time slots in which a field unit transmits an access request message to the base station for establishing a communication link. In response to an access request message, feedback information is provided from the base station to multiple field units indicating whether a collision was detected on the first channel for a message transmitted in a previous time slot. In an instance when a collision is detected, the field unit will re-transmit an access request message at a previous power level setting based on a random back off time. If no collision is detected and the base station fails to transmit an acknowledgment message from the base station to the access requesting field unit, the power output level of the field unit is increased for successive message transmissions until the message is received.

36 Claims, 9 Drawing Sheets

FIG. 1

U.S. PATENT DOCUMENTS

| | | | |
|---|---|---|---|
| 5,267,262 A | 11/1993 | Wheatly, III | 375/1 |
| 5,339,316 A * | 8/1994 | Diepstraten | 370/401 |
| 5,422,887 A * | 6/1995 | Diepstraten et al. | 370/347 |
| 5,657,326 A * | 8/1997 | Burns et al. | 370/349 |
| 5,805,994 A | 9/1998 | Perreault et al. | 455/435 |
| 5,867,527 A | 2/1999 | Ziv et al. | 375/208 |
| 5,892,774 A | 4/1999 | Zehavi et al. | 370/527 |
| 5,893,035 A | 4/1999 | Chen | 455/522 |
| 5,933,781 A | 8/1999 | Willenegger et al. | 455/522 |
| 5,960,361 A | 9/1999 | Chen | 455/522 |
| 5,982,760 A | 11/1999 | Chen | 370/335 |
| 5,991,284 A | 11/1999 | Willenegger et al. | 370/335 |
| 6,075,974 A | 6/2000 | Saints et al. | 455/69 |
| 6,094,576 A | 7/2000 | Hakkinen et al. | 455/422 |
| 6,097,972 A | 8/2000 | Saints et al. | 455/572 |
| 6,101,179 A | 8/2000 | Soliman | 370/342 |
| 6,118,767 A | 9/2000 | Shen et al. | 370/252 |
| 6,157,616 A * | 12/2000 | Whitehead | 370/445 |
| 6,188,678 B1 | 2/2001 | Prescott | 370/318 |
| 6,269,088 B1 * | 7/2001 | Masui et al. | 370/335 |
| 6,272,354 B1 | 8/2001 | Saaroi | 450/522 |
| 6,275,478 B1 | 8/2001 | Tiedemann, Jr. | 370/318 |

* cited by examiner

ACCESS PROBE ACKNOWLEDGMENT
INCLUDING COLLISION DETECTION TO
AVOID OVERSETTING INITIAL POWER
LEVEL

RELATED APPLICATIONS

This application claims the benefit of U.S. Provisional Application No. 60/184,223 filed on Feb. 23, 2000, the entire teachings of which is incorporated herein by this reference.

BACKGROUND OF THE INVENTION

A specific protocol has been developed for allowing multiple users to transmit over a shared radio channel. For example, the IEEE (Institute of Electrical and Electronics Engineers) 802.11 Standard generally supports access to radio channels based on a method known as Carrier Sense Multiple Access with Collision Avoidance (CSMA/CA).

In simple terms, this method is based on a "listen before talk" scheme. A transmitter device monitors traffic on a shared radio channel to determine if another transmitter device is presently transmitting on the same channel. If the radio channel is in use, the transmitter device will continue to monitor the channel until it is clear. When the radio channel is finally clear, the transmitter will then transmit over the radio channel.

Ideally, another transmitter device will not simultaneously transmit during the same time. However, a collision can occur on the radio channel when two or more transmitter devices transmit on the radio channel simultaneously. Consequently, neither message transmission would be intelligible and both transmitter devices must re-transmit their messages again to a corresponding target device.

Based on this CSMA/CA scheme, re-transmission of data due to a collision cannot occur before a minimum time gap. After the minimum time gap has passed, the transmitter device selects a random "backoff interval," which is the wait time before the radio channel is again monitored to determine whether the radio channel is clear to transmit. If the channel is still busy, another shorter "backoff interval," is selected for a subsequent message transmission. This process is repeated until the transmitter device is able to transmit data.

Another standard for transmitting data on a shared radio channel is based on IS-95, in which multiple field units can transmit at the same time.

The IS-95 standard suggests a method of ramping RF power of a field unit until a message from the field unit is transmitted at a power level that is detectable at a base station. According to this method, a field unit transmits an access request message to a base station for the assignment of wireless resources on a reverse link.

After transmitting an access request message on an access channel, the field unit monitors a paging channel for an acknowledgment message from the base station indicating that the access request message was properly received. If no acknowledgment message is sent to the requesting field unit, it is presumed that the message from the field unit was not transmitted at an appropriate power level. That is, the power output level of the field unit is so low that the base station did not detect a previously transmitted access request message. The access request message is then re-transmitted over the access channel at a higher power level.

This process is subsequently repeated until the field unit transmits a message at a power level that is high enough for the base station to properly receive the message. Similar to the IEEE 802.11 standard, a collision can occur on the shared radio channel when two or more field units simultaneously transmit a message.

SUMMARY OF THE INVENTION

The present invention is generally directed towards an apparatus and method for enhancing the utilization of resources in a wireless communication system. In an illustrative embodiment, messages are transmitted over a shared channel to a target receiver. The shared channel is monitored for collisions that can occur when two or more transmitter devices attempt to send a message at or about the same time. Feedback is provided to notify one or multiple transmitters when a collision is detected.

One method of notifying the transmitter devices of a collision is to provide feedback in a reverse channel to the transmitter devices. More specifically, a device such as a base station monitoring the shared channel for collisions can transmit messages indicating that a collision occurred on the first channel for a previous message transmission.

In a specific application, the transmitter device is a field unit transmitting a message such as an access request message to a target receiver monitoring a channel for messages. For example, the shared channel can be a reverse link radio channel defined by codes such as those used in wireless CDMA (Code Division Multiple Access) communication systems. More specifically, the shared reverse link channel can be an access channel. The second channel for notifying field units of message collisions can be a forward link radio channel defined by another unique PN (pseudnoise) code.

To support communications between a transmitter and target receiver device such as a base station, the transmitter can synchronize itself prior to transmitting messages on the shared channel. Thus, there can be at least some structure as to when a transmitter device sends a message over the shared channel. Alternatively, a transmitter device can send a message asynchronously over the shared channel.

In an application where the transmitter is at least grossly synchronized with the target receiver, the transmitter can then transmit in a time slot or data field of the shared channel. Consequently, a device monitoring the shared channel for message collisions can monitor time slots of the shared channel for messages. One way to determine whether a message is properly received is to provide redundancy information in the message itself, where a check can be performed to verify that a message is properly received.

If a transmitter device sends a message over the shared channel and no collision is detected at the target receiver, a message such as an ACK (Acknowledgment) message can be fed back to the transmitter device indicating that a message from the transmitter was successfully received at the target receiver without detecting a collision. This ACK message is optionally fed back to a transmitter device over a third channel such as a paging channel of a CDMA communication system. Thereafter, a more formal communication link is optionally established between the transmitter and target receiver for future communications.

A more formal communication link can include a feedback loop for synchronizing a transmitter device to a target receiver when no data payload is being transmitted from the transmitter device target receiver. For example, a target receiver can analyze received messages and generate power and timing adjustment messages on a feedback channel to provide synchronization and power control. Since the feedback loop can be used to provide more sophisticated synchronization between two communication devices, wireless resources can be more quicky allocated for on-demand data payload transfers.

In one application, the second channel or feedback channel is time-slotted or partitioned so that transmitter devices can be notified via feedback messages in time slots similar to the first channel. Consequently, each of the multiple transmitters can monitor designated time slots of the second channel for feedback messages.

A feedback message can be as simple as a single bit indicating whether or not a collision occurred on the shared channel for a previous access request message transmission. Likewise, a sequence of bit information or multiple spaced bits can also be sent over the second channel indicating that a collision occurred. When used, multiple bits can provide redundancy to some extent so that a message can still be conveyed even if part of a message is otherwise corrupted due to a failed data transfer.

In an application where the shared channel is time-slotted, each of the multiple transmitter devices is preferably synchronized so that it can send a message to a target receiver in generally any time slot. When transmitter devices sporadically transmit messages in a time slot to a target receiver, there is an increased likelihood that a collision will occur with another transmitter sending a message in the same time slot.

Although a message format can vary depending on a particular application, one embodiment of the present invention involves sending a two-part message on the shared channel. For example, a first portion of a message commonly used by a set of multiple transmitter devices can indicate a message type such as an access request message. More specifically, the first portion of a message can include a specified sequence of bits or information that identify a message type at the target receiver. Further, a second portion of a message can identify unique information such as the serial number of the transmitter sending the message to the target receiver.

When a two-part message is simultaneously transmitted to a target receiver from two or more transmitter devices, a collision can occur. One way of detecting a collision is to monitor a time slot of a first channel on which multiple transmitter devices may transmit a message. A first portion of each message will preferably line up with each other when transmitted by two transmitters in a time slot so that a monitoring target receiver can identify that a message such as an access request message was sent by at least one transmitter. More specifically, the monitoring device can decode and identify a message type based upon an overlapping bit sequence transmitted by two or more transmitters in a same time slot. The monitoring device can also identify when only one message is transmitted in a time slot by analyzing a unique portion of a message.

Consider further the second portion of a message transmitted by two or more transmitter devices. The second portion of a message transmission is preferably unique so that a collision can be detected at a monitoring device. That is, the second portion of each message can be unique so that the data does not necessarily overlap with each other when two or more transmitters send a message in a time slot. Thus, when a collision occurs, the monitoring device cannot properly decode either unique second portion of a message transmission in a time slot.

One way to identify a message collision is to detect when the second portion of a message as received at a monitoring device does not include proper CRC (Cyclical Redundancy Check) information. For example, a monitoring device can identify a bad CRC check result for a second portion of a received message in a time slot. Although the first portion of the message is properly received and indicates that at least one transmitter is sending a message, processing of the second portion of the message at the monitoring device can indicate that a collision occurs when an error is detected. Consequently, the device monitoring the shared channel for collisions can generate a message over the second channel to the transmitter indicating that a collision occurred at the monitoring target receiver in a given time slot.

In the event that both a first and second portion of the message can be verified as properly received, the monitoring device can determine that a collision did not occur by two or more transmitter devices transmitting in the same time slot and identify which transmitter sent the message. Thereafter, an ACK message can be sent to the appropriate transmitter device to establish a communication link between a requesting field unit and base station.

If used, error detection and correction information can be included in both the first and second part of a message to determine whether there was a collision of either the first or second portion of a message. One of multiple codes in the first portion of the message can be used to identify a message type.

Another aspect of the present invention involves setting a transmitter power level so that an initial message transmission minimally interferes with other transmitter devices. In such a case, an initial power level can be set so low that it may not be detected by a target receiver monitoring the shared channel.

A power output level of a transmitter device can be adjusted depending upon whether a message collision is detected. More specifically, if no collision is detected and no ACK message is sent to a transmitter indicating that a message was received, the power output level of the transmitter can be increased for subsequent message transmissions. Typically, the power output of a transmitter device is increased a predetermined amount for each subsequent attempt to transmit a message to a target receiver if there is no collision. For example, if a message is not acknowledged by the target receiver monitoring the first channel, the power output level for a subsequent message transmission can be increased by 0.5 db (decibels) to increase the likelihood that it will be detected.

If a message from a transmitter is properly received at a target receiver, this power output level of the transmitter is used to determine at what power level subsequent messages can be transmitted for other modulation rates. Power level adjustments for subsequent message transmissions can also be tracked by a transmitter for determining at what level the target receiver acknowledges receipt of a message from a transmitter device.

Yet another aspect of the present invention involves re-transmitting a subsequent message based on a random back-off time. For example, if a message collision occurs, a subsequent message can be transmitted at a random future time. Consequently, two transmitter devices that previously experienced message collisions in a specific time slot can subsequently re-transmit in preferably different time slots so that their corresponding subsequent message transmissions can be properly detected at a device monitoring the first channel. When a message is re-transmitted due to a message collision, the subsequent message re-transmission can be transmitted at a previous power level since a collision was detected and it is not known whether the monitoring device would have otherwise properly received a message if the collision did not occur.

Another embodiment of the present invention involves detecting that a collision occurs when more than two transmitter devices attempt to send a message over a first channel. A power output level of a corresponding transmitter is then adjusted depending upon whether a collision occurs. Consequently, the power output level of a transmitter is adjusted higher so that subsequent message transmissions can be detected at a target receiver monitoring the first channel for message collisions.

In the event that no collision is detected, the power output level of the transmitter can be increased a predetermined amount such as 1 dB. If no collision is detected for a previous message transmission, a transmitter can re-transmit a message at a previous power level.

A transmitter is optionally notified of collisions detected on the first channel based on a feedback message received on a second channel. The feedback messages on the second channel can be transmitted by a device monitoring the first channel for message collisions. A feedback message can include information such as a single bit, a bit sequence or spaced sequence of bits indicating whether a collision was previously detected at the monitoring device.

Another embodiment of the present invention involves allocating a first channel on which two or more transmitters may attempt to transmit a message. The first channel is divided into time slots in which one or more transmitters may attempt to send a message. A first part of the message typically includes a common coded sequence that overlaps when two or more transmitters send a same message in a time slot. Since simultaneously transmitted messages overlap in at least some respect for a particular message type, a device monitoring the first channel can identify a common message type transmitted by the two or more transmitters. Consequently, a monitoring device is able to identify that a message was sent by one or more transmitter devices.

A second part of a potentially two-part message can be unique to a corresponding transmitter. In one instance, the second part of a message can be used to identify whether a collision occurs between two transmitter devices. For example, the first part of the message received at a target device can indicate that a least one transmitter device sends a message since a portion of the message transmissions by two or more simultaneously transmitting devices can overlap. The second part of the message if properly received, can indicate that no collision occurred and only one transmitter sends a message in a time slot. For example, if the second part of a message is not properly received at a target receiver, it can be determined that a collision occurred by two or more transmitters transmitting in a time slot.

In one application, a redundancy check sequence is included in the second portion of a message transmission so that a monitoring device can determine if a message is properly received.

The first part of a message can also include redundancy check information for determining whether multiple transmitters send a common message within a time slot. For example, two different transmitters may send two different message types within a same time slot and, thus, no portion of a message might overlap in such a case.

In one application, the second part of a message includes information indicating from which transmitter a message is transmitted. Consequently, a monitoring device can reply by sending a message directed specifically to the transmitter.

A second channel can also be used to provide feedback messages to the transmitter devices to indicate whether a collision is detected at the device monitoring the first channel.

As previously discussed, certain aspects of the present invention can be used to support access of wireless communication resources. For example, multiple transmitter devices attempting to simultaneously transmit messages on an access channel can be monitored for collisions. The collision information can then be used for multiple purposes. For example, a transmitter device can determine whether or not a previous message transmission is even detected a target receiver. If not, the message can be re-transmitted to the target receiver until a reply is received.

Collision feedback information can also be used to adjust a power level of a transmitter device. For example, if a collision is not detected or an acknowledgment message is not received on a feedback channel, a corresponding transmitter device can subsequently transmit a message at a higher power output level to increase the likelihood that a message is detected at a target receiver. Accordingly, aspects of the present invention minimize interference on radio channels as power level outputs of the transmitter devices are reduced. More specifically, a transmitter device eventually sends a message at a minimal, but detectable power level.

The average time necessary to transmit a message to a target receiver is also reduced because a transmitter is notified of a collision in a feedback path and can therefore re-transmit a message in a random future time slot, reducing the likelihood of a subsequent collision.

Figure 1:
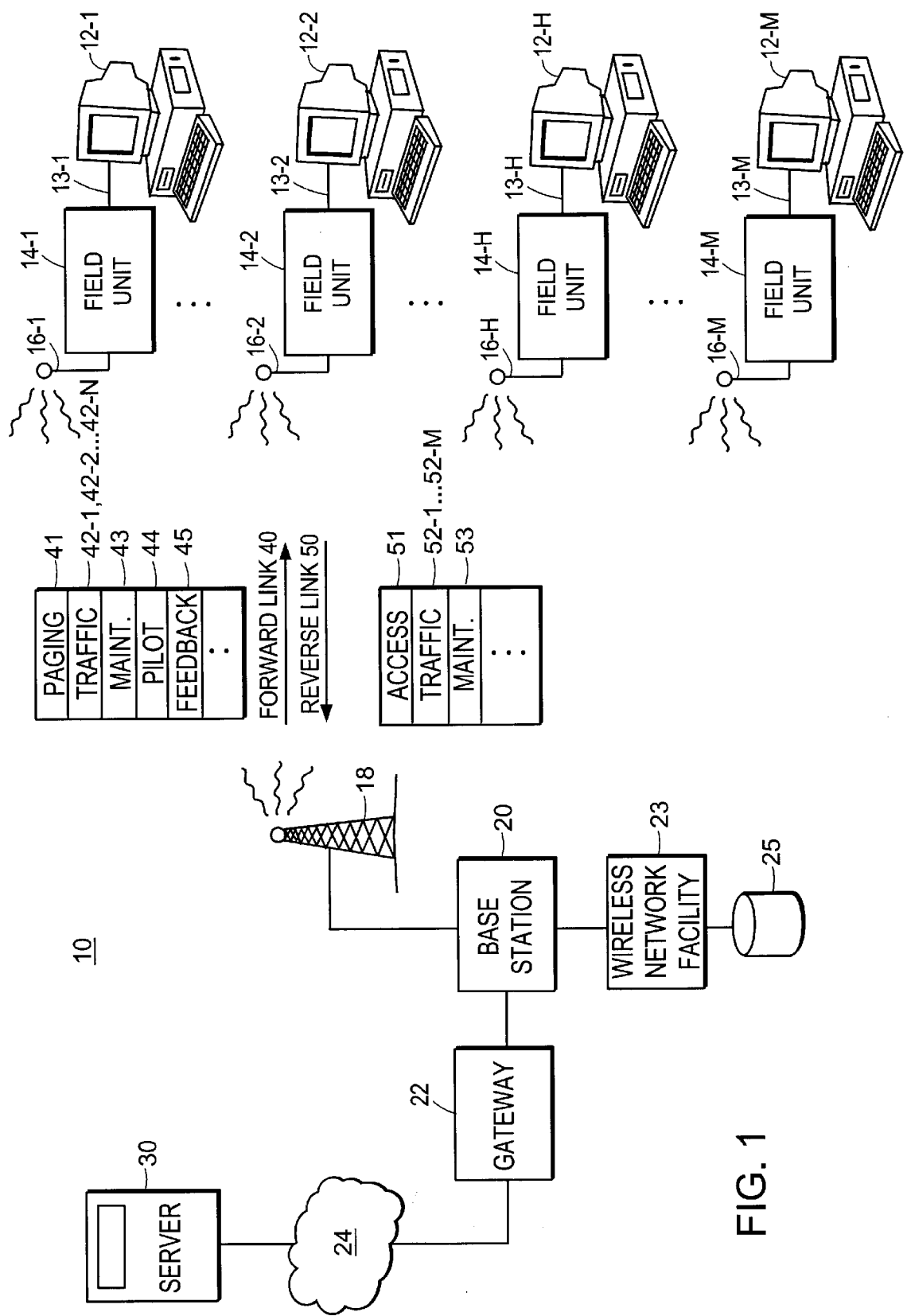
FIG. 1 is a bock diagram of an illustrative wireless communication system according to certain principles of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a block diagram illustrating a wireless communication system supporting the transmission of data information over multiple allocated communication channels according to certain aspects of the present invention. As in many wireless communication systems, users compete for wireless bandwidth allocation. Hence, it is desirable that the wireless communication 10 is optimized for data throughput and, in certain applications, hi-speed bursts of data throughput.

Certain aspects of the present invention are based on the recognition that the power output of a field unit transmitting over a wireless channel can be controlled so that it minimally interferes with other field units using the same general wireless airspace. In particular, a power output level of a newly transmitting field unit is initially set so low that a base station may not detect messages transmitted by the field unit. This initially low power setting of a field unit reduces co-channel interference because the transmitter device is not transmitting at excessive power levels. During subsequent communication attempts with the base station, the power output of a field unit is then ramped up until messages are acknowledged at the base station.

In one application, one or multiple field units randomly transmit messages on a first allocated channel. When two field units transmit a message simultaneously on this first allocated channel, there can be a message collision at the base station. The base station may be able to detect that a message was transmitted by a field unit and there was a message collision. However, the base station may not be able to decipher the contents of the message and determine from which field unit transmitted a message. Thus, in certain situations, the base station can not transmit a message directed specifically to a particular field unit indicating that a collision occurred for a previous message transmission.

One aspect of the present invention involves providing general feedback information to the field units indicating that a collision was detected. Consequently, a previous undetected message can be re-transmitted by a field unit. If there was no collision detected and no acknowledgment received by the filed unit, the field unit can successively ramp up its power output setting for subsequent message transmission attempts to ensure that a message will eventually be acknowledged by the base station.

According to the following description of a preferred embodiment, communication system 10 is described as a wireless communication link such as a CDMA radio channel utilizing shared channel resources. However, it should be noted that the techniques described herein can be applied in other applications supporting shared access. For example, the principles of the present invention can be applied to other general applications such as telephone connections, computer network connections, cable connections, or other physical media to which allocation of resources such as data channels are granted on an as-needed basis.

As shown, communication system 10 includes a number of Personal Computer (PC) devices 12-1, 12-2, . . . 12-h, . . . 12-m, corresponding field units or terminals 14-1, 14-2, . . . 14-h, . . . 14-m, and associated directional antenna devices 16-1, 16-2, . . . 16-h, . . . 16-m. Centrally located equipment includes a base station antenna 18, and a corresponding base station 20 that includes high speed processing capability.

Base station 20 and related infrastructure provides connections to and from a network gateway 22, network 24 such as the Internet, and network file server 30. Communication system 10 is preferably a demand access, point to multipoint wireless communication system such that the PC devices 12 can transmit data to and receive data from network server 30 based on a logical connection including bi-directional wireless connections implemented over forward links 40 and reverse links 50. That is, in the point to multi-point multiple access wireless communication system 10 as shown, a given base station 20 typically supports communication with a number of different field units 14 in a manner which is similar to a cellular telephone communication network. Accordingly, system 10 can provide a framework for a CDMA wireless communication system where digital information is relayed on-demand between multiple mobile cellular users and a hardwired network 24 such as the Internet.

PC devices 12 are typically laptop computers, handheld units, Internet-enabled cellular telephones, Personal Digital Assistant (PDA)-type computers, digital processors or other end user devices, although almost any type of processing device can be used in place of PC devices 12. One or multiple PC devices 12 are each connected to a respective subscriber unit 14 through a suitable hard wired connection such as an Ethernet-type connection via cable 13.

Each field unit 14 permits its associated PC device 12 access to network file server 30. In the reverse link 50 direction, that is, for data traffic transmitted from the PC 12 towards the server 30, the PC device 12 transmits information to field unit 14 based on, for example, an Internet Protocol (IP) level network packets. The field unit 14 then encapsulates the wired framing, i.e., Ethernet framing, with appropriate wireless connection framing so that data packets can be transmitted over the wireless link of communication system 10. Based on a selected wireless protocol, the appropriately formatted wireless data packet then travels over one of the radio channels that comprise the reverse link 50 through field unit antenna 16 to base station antenna 18. At the central base station location, the base station 20 then extracts the radio link framed data packets and reformats the packets into an IP format. The packets are then routed through gateway 22 and any number or type of networks 24 to an ultimate destination such as a network file server 30.

In one application, information generated by PC device 12 is based on a TCP/IP protocol. Consequently, a PC device 12 has access to digital information such as web pages available on the Internet. It should be noted that other types of digital information can be transmitted over channels of communication system 10 based on the principles of the present invention.

Data information can also be transferred from the network file server 30 to PCs 12 on forward link 40. In this instance, network data such as IP (Internet Protocol) packets originating at file server 30 travel on network 24 through gateway 22 to eventually arrive at base station 20. As previously discussed for reverse link data transmissions, appropriate wireless protocol framing is then added to raw data such as IP packets for communication of the packets over wireless forward link 40. The newly framed packets then travel via an RF signal through base station antenna 18 and field unit antenna 16 to the intended target field unit 14. An appropriate target field unit 14 decodes the wireless packet protocol layer, and forwards the packet or data packets to the intended PC device 12 that performs further processing such as IP layer processing.

A given PC device 12 and file server 30 can therefore be viewed as the end points of a logical connection at the IP level. Once a connection is established between the base station processor 20 and corresponding field unit 14, a user at the PC device 12 can then transmit data to and receive data from file server 30 on an as-needed basis.

Reverse link 50 optionally includes different types of logical and/or physical radio channels such as an access channel 51, multiple traffic channels 52-1, . . . 52-m, and a maintenance channel 53. The reverse link access channel 51 is typically used by the subscriber units 14 to request an allocation of traffic channels by the base station 20. For example, traffic channels 52 can be assigned to users on an as-needed basis. The assigned traffic channels 52 in the reverse link 50 then carry payload data from field unit 14 to base station 20.

Notably, a given link between base station 20 and field unit 14 can have more than one traffic channel 52 assigned to it at a given instant in time. This enables the transfer of information at higher rates.

Maintenance channel 53 can be used to carry maintenance information such as synchronization and power control messages to further support transmission of digital information over both reverse link 50 and forward link 40.

Forward link 40 can include a paging channel 41, which is used by base station 20 to inform a field unit 14 of general information such as that one or multiple forward link traffic channels 42 have been allocated to it for forward link data transmissions. Traffic channels 42-1 . . . 42-n on the forward link 40 are used to carry payload information from base station 20 to a corresponding target subscriber unit 14.

Maintenance channel 43 can be used to transmit synchronization and power control information on forward link 40 from base station processor 20 to field units 14. Additionally, paging channel 41 can be used to inform a field unit 14 of allocated traffic channels 52 in the reverse link 50 direction.

Traffic channels 42 of the forward link 40 can be shared among multiple subscriber units 14 based on a Time Division Multiplexing scheme. Specifically, a forward link traffic channel 42 is optionally partitioned into a predetermined number of periodically repeating time slots for transmission of data packets from the base station 20 to multiple subscriber units 14. It should be understood that a given subscriber unit 14 can, at any instant in time, have multiple time slots or no time slots assigned to it for use. In certain applications, an entire time-slotted forward or reverse link traffic channel can also be assigned for use by a particular field unit 14 on a continuous basis.

Figure 2:
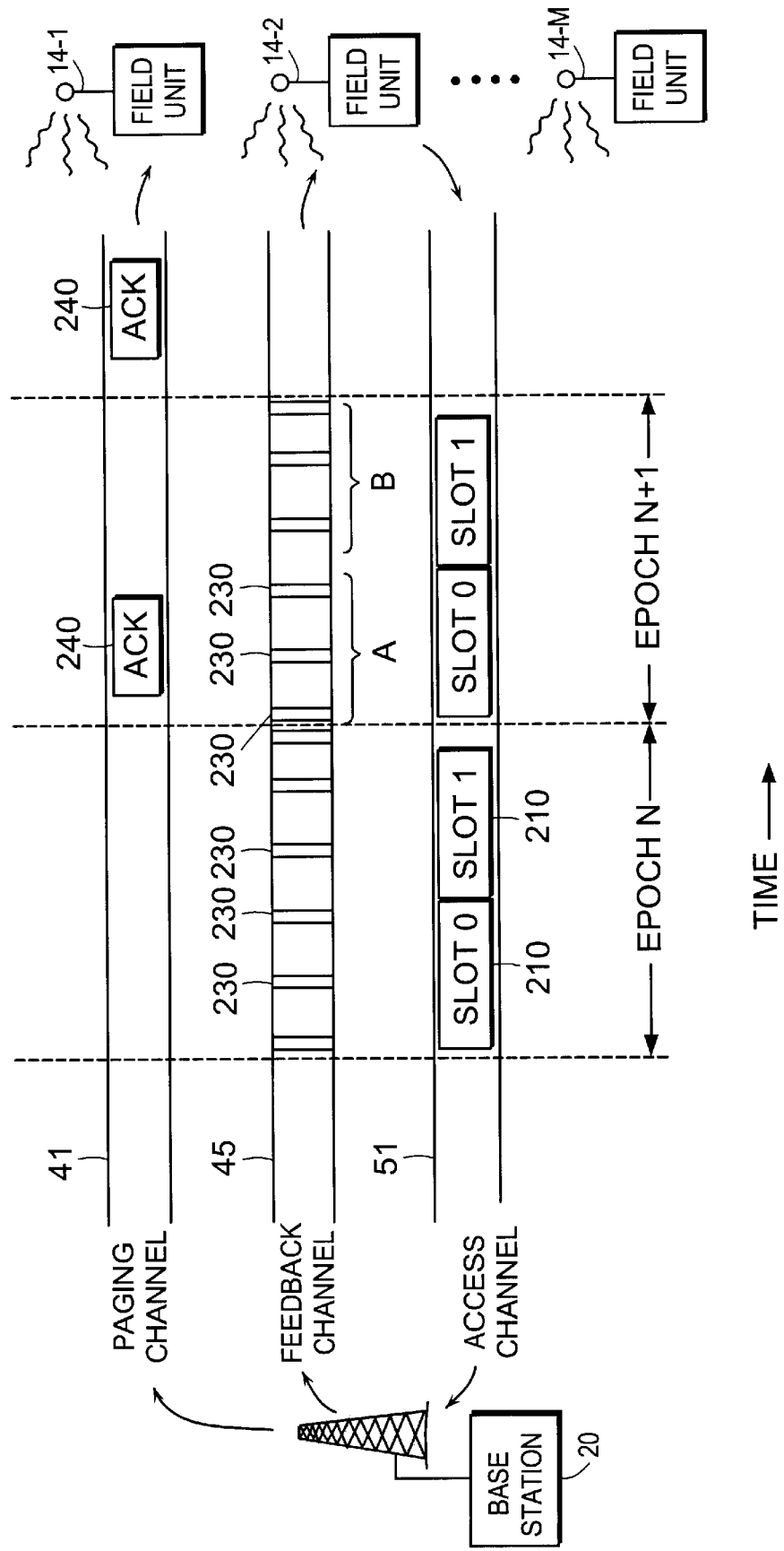
FIG. 2 is a timing diagram illustrating multiple channels on which messages are transmitted according to certain principles of the present invention.

FIG. 2 is a timing diagram illustrating multiple channels on which messages are transmitted between a base station 20 and field units 14 according to certain principles of the present invention. As shown, field units 14 can transmit messages to base station 20 over a dedicated channel such as access channel 51. Access channel 51 supports a transmission of access request messages from a field unit 14 to base station 20. An access request message can indicate a request by field unit 14 for a high speed bi-directional communication link.

Message transmissions over access channel 51 need not be limited to access request type messages. For example, access channel 51 can be structured to support other types of messages.

In the illustrative timing diagram as shown in FIG. 2, access channel 51 is optionally partitioned into periodically repeating time slots 210 in which messages are transmitted from a field unit 14 to base station 20. More specifically, an Epoch on the order of 26.6 mS in duration can be partitioned to include time slot #0 and time slot #1 as shown. In this application, a field unit or multiple field units 14 can randomly send messages to base station 20 in either time slot of an Epoch. Providing multiple time slots 210 in which a field unit 20 can transmit a message renders it less likely that two randomly transmitting field units 14 will transmit a message in a same time slot 210. Depending on an application, a field unit 14 can be synchronized with base station 20 using pilot channel 44 so that messages can be transmitted in a particular time slot 210.

When a collision occurs, i.e., two field units 14 transmit a message in the same time slot 210, a device monitoring access channel 51 for such messages may not be able to properly decode or decipher the content of either transmitted message. An indication of this condition is transmitted to field units 14.

Feedback channel 45 is provided so that base station 20 can send feedback messages 230 to field units 14. At least a portion of the feedback channel 45 as shown is reserved for transmitting general messages to the collective field units 14 whether or not a message collision occurred on access channel 51 in a previous Epoch and, more particularly, that a message occurred in a particular time slot 210.

A feedback message 230 is optionally a sequence of encoded information or single bit indicating whether a collision occurred for a message transmitted to base station 20 in a time slot 210. As shown, multiple feedback messages 230 can be generated during a given time duration such as an Epoch or half Epoch. For example, feedback information such as feedback messages 230 can be transmitted in duration A of Epoch N+1 to indicate that a collision occurred for the reception of a message 210 in time slot #0 of Epoch N at base station 20. More specifically, a logic 1 transmitted in each of three feedback messages 230 of duration A can indicate that a collision was detected while a logic 0 setting can indicate that no collision was detected.

Transmitting multiple, spaced feedback messages 230 as shown for duration A provides redundancy to some extent. For example, multiple messages 230 transmitted in a given duration, such as duration A, can be part of a redundantly transmitted message to increase the chance that a field unit 14 will be properly notified whether a collision occurs. Hopefully, at least one of the multiple feedback messages 230 can be identified at a field unit 14 even if a message transmission failure occurs for some of the messages 230 in, for example, duration A.

In a similar manner as previously discussed, feedback messages 230 of feedback channel 45 transmitted in duration B of Epoch N+1 can indicate whether a message collision is detected in time slot #1 of Epoch N as monitored by base station 20.

In a reverse link direction, a message transmitted by a field unit 14 to base station 20 on access channel 51 includes unique information such as the identification number of the field unit 14 transmitting the message. In forward link direction, paging channel 41 supports message transmissions from base station 20 to field units 14, where the message transmissions are typically directed to a specific field unit 14. Thus, base station 20 can respond to a field unit 14 that sent a message on access channel 51 by transmitting a reply message to the field unit 14 over paging channel 41. Other link information forwarded on the paging channel 41 can be forwarded to a field unit 14 to establish a formal bi-directional link between base station 20 and field unit 14.

One type of message transmitted on paging channel 41 is an ACK (acknowledgment) message 240. ACK messages 240 are sent by base station 20 to indicate that a message received in a time slot 210 of access channel 51 was properly received. Similar to the feedback messages 230 on feedback channel 45, ACK messages transmitted to a field unit 14 are also feedback messages. However, an ACK message 240 indicates that a previous access request message transmitted by a field unit 14 was properly received. ACK message 240 can also indicate that a formal communication link will be established with the access requesting field unit 14. For instance, traffic channels can be assigned to field unit 14 for transmitting or receiving a data payload.

It should be noted that field units 14 optionally transmit at such a low power output level that messages transmitted in a particular time slot 210 are not detected at base station 20. In this instance, a field unit 14 can adjust its power output level for a subsequent message transmission based on feedback information received from base station 20. More specifically, a field unit 14 can adjust its power output level depending on a feedback message 230 or ACK message 240 received on feedback channel 45 or paging channel 41 respectively. Accordingly, the power output level of a field unit 14 can be optimized so that it minimally interferes with other field units 14 transmitting information over a common radio frequency.

Although other message types can be supported, the messages transmitted in a time slot 210 of access channel 51 are typically access request messages indicating that a field unit 14 would like to receive or transmit data payload information on reverse link traffic channels 52 or forward traffic channels 42.

One aspect of adjusting the power output of a field unit 14 is to determine whether or not a collision was detected for a previous message transmission from the field unit 14 to base station 20. For example, if a collision is not detected for a previously transmitted message from a particular field unit 14, the power output level for a subsequent message transmission from the field unit 14, if any, can be increased so that base station 20 is more likely to detect the message transmission. More specifically, the power output level of a field unit 14 can be increased a predetermined amount such as +0.5 dB for a subsequent message transmission if no collision was detected for a previous message transmission.

In the event that a message transmission by a field unit 14 does result in a collision due to multiple field units 14 transmitting in a same time slot 210, the power output level of the field unit 14 can be unchanged or potentially reduced for a subsequent message transmission since it is not known whether the message transmission by a field unit 14 would have otherwise been detected at base station 20 if only one field unit 14 transmitted a message within a particular time slot 210. Hence, one aspect of the present invention involves adjusting the power output level of a field unit 14 so that it minimally interferes with others using the same radio channel.

This method of transmitting messages can be particularly useful when a user first powers a field unit 14 and must communicate with base station 20. For example, it is undesirable in certain situations to transmit a message at such a high power output level that such message transmissions cause other data transmissions on the radio channel to become corrupted due to excessive noise.

In a similar manner as previously discussed, the power output level of a field unit 14 can be adjusted depending on whether base station 20 acknowledges receipt of a message on access channel 51. Thus, if field unit 14 does not detect a reply ACK message 240, the power output level of field unit 14 can be increased for subsequent message transmissions.

A maximum power adjustment level such as 60 dBm can be selected in which the field unit 14 will discontinue transmitting if no ACK message is received even at this level.

A more sophisticated application of the present invention can involve adjusting a power output level of a field unit 14 depending on both a feedback message 230 indicating whether a collision was detected and an ACK message 240 indicating that an access message was acknowledged by base station 20. More specifically, a field unit 14 can adjust its power output level for subsequent message transmissions if no collision is detected and no ACK message is received for a previously transmitted message from a field unit 14. Otherwise, the field unit 14 can re-transmit at a previous power output level.

Regardless of which method is used to adjust the power output level, the power level setting at which base station 20 acknowledges receipt of a message from a field unit 14 can be used to determine power level settings at which the field unit 14 must transmit other information to base station 20. For example, a message from a field unit 14 can be transmitted using a particular modulation rate during the initial message transmission. The power output level of subsequent transmissions from the field unit 14 can be adjusted to accommodate transmitting messages at different modulation rates. For example, it can be determined at what power level a field unit should transmit on allocated traffic channels using a different modulation rate. A history of the power level output adjustments are optionally maintained to track power adjustments and determine at what power level a monitoring device such as base station 20 detects the transmission of a message.

As previously discussed, one aspect of the present invention involves re-transmitting a message from a field unit 14 so that it can be detected at base station 20. A re-transmission is optionally based on a random back off time so that a collision is less likely to occur on a subsequent attempt to transmit a message.

Consider a situation where two or more field units 14 transmit a message over access channel 51 and a collision is detected at base station 20. As previously discussed, a feedback message will be transmitted to the field units 14 indicating that a collision occurred. Both field units 14 must then re-transmit their corresponding messages to base station 20.

To avoid another collision, the field units 14 randomly choose a back off time relative to the previous message transmission in which the collision occurred and transmit in another time slot 210. For example, if field unit A and field unit B transmit a message in time slot #0 of Epoch N, field unit A will choose a back off time such as 3 Epochs and re-transmit a message to base station 20 in time slot #1 of Epoch N+3 while field unit B re-transmits a message based on a random back off time in time slot #0 of Epoch N+2. Accordingly, field units A and B are less likely to cause another collision for a message re-transmission.

Figure 3:
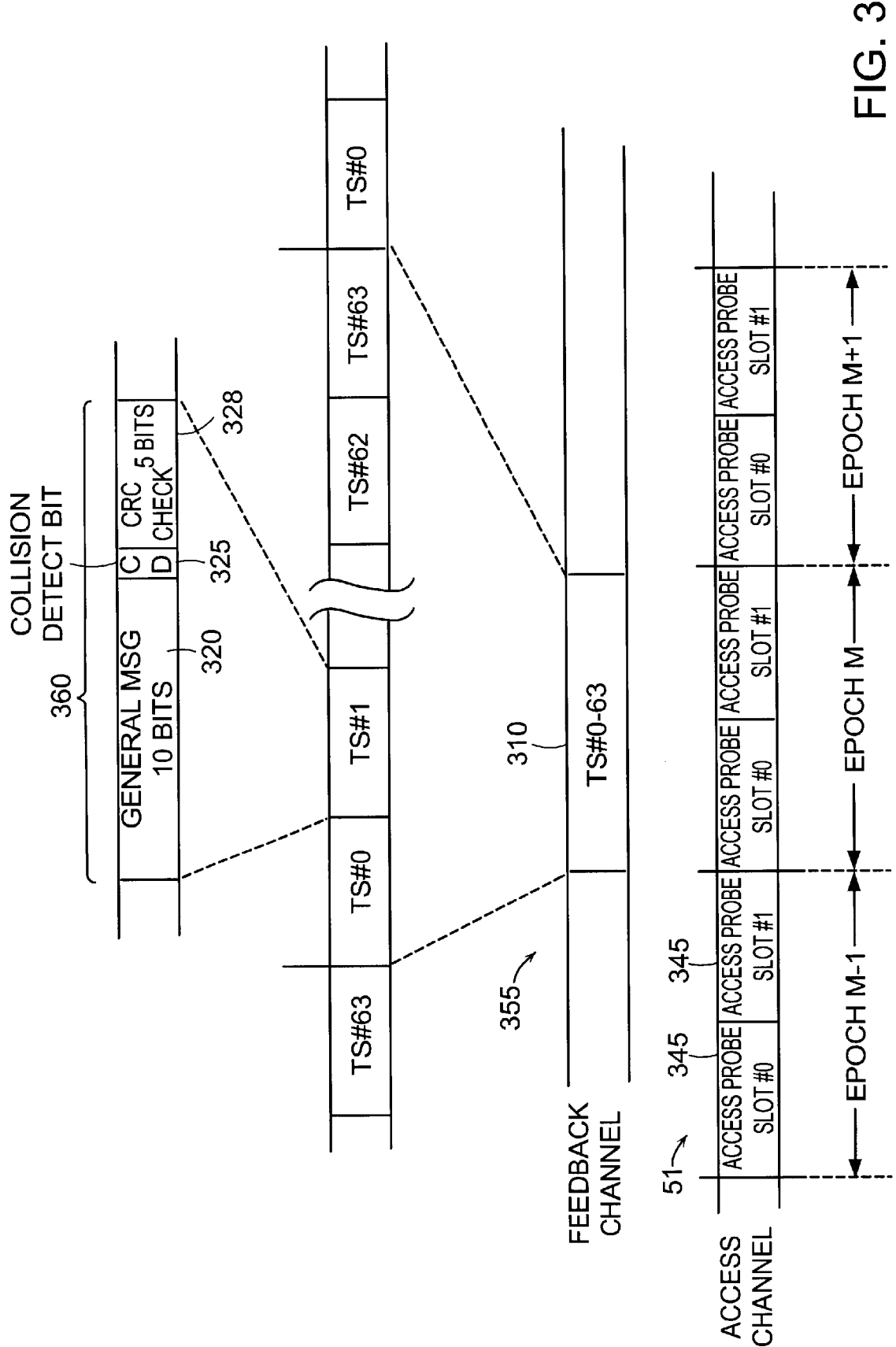
FIG. 3 is a timing diagram illustrating a use of data fields within a time-slotted channel according to certain principles of the present invention.

FIG. 3 is a timing diagram illustrating another embodiment of the present invention for transmitting feedback messages to field units 14. An access channel 51 is partitioned so that a field unit 14 can transmit an access probe or other message in a time slot 345. As shown, feedback channel 355 is partitioned to include 64 time slots TS#0, TS#1, TS#2 . . . TS#63 that repeat every Epoch.

Each time slot 315 of feedback channel 355 preferably includes a data field supporting 16 bits of information. In the specific application as shown, ten bits of information are reserved for a general message, one bit is reserved as a collision detect bit 325 and five bits are reserved for CRC (Cyclical Redundancy Check) data 328.

General message 320 is optionally a message directed to a particular field unit 14. For example, each of multiple field units 14 can be assigned use of a particular time slot 315 for receiving feedback information from base station 20 to field units 14. When assigned, a corresponding field unit 14 monitors an appropriate time slot 315 to receive messages from base station 20. One type of specific message in a time slot 315 is feedback information to a field unit 14 indicating how its timing or power should be adjusted so that messages transmitted from a field unit 14 are properly received at base station 20.

Time slots 315 are optionally unassigned and the message itself can include an address to which field unit 14 a message is directed. Thus, in a modified embodiment, feedback messages can be transmitted asynchronously to a field unit 14.

Collision detect bit 325 in a time slot 315 is a single bit indicating whether a collision occurred in a monitored time slot 345. More specifically, collision detect bits 325 of time slot TS#0, TS#1 . . . TS#31 of Epoch M can be used to indicate that a collision occurred in access probe slot #0 of Epoch M−1. Accordingly, this string of individual collision detect bits 328 over multiple time slots can be set to a same logic state indicating that a collision was detected.

In a similar manner, TS#32, TS#33 . . . TS#63 of Epoch M can be set appropriately to indicate whether a collision occurred on access probe slot #1 of Epoch M−1. Thus, a monitoring field unit 14 can determine whether a collision occurred at base station 20 based on a single bit, a sequence of multiple bits, or a sequence of spaced bits.

CRC data 328 is also provided in a feedback message 360. The CRC data 328 is optionally decoded at the field unit 14 to ensure that a message 360 is properly received at a field unit 14 and, more specifically, that a particular collision detect bit 325 is properly received. Other methods can also be used to ensure and verify that a message and data is properly received at field unit 14. For example, a message can be transmitted based on an FEC (Forward Error Correction) code.

Figure 4:
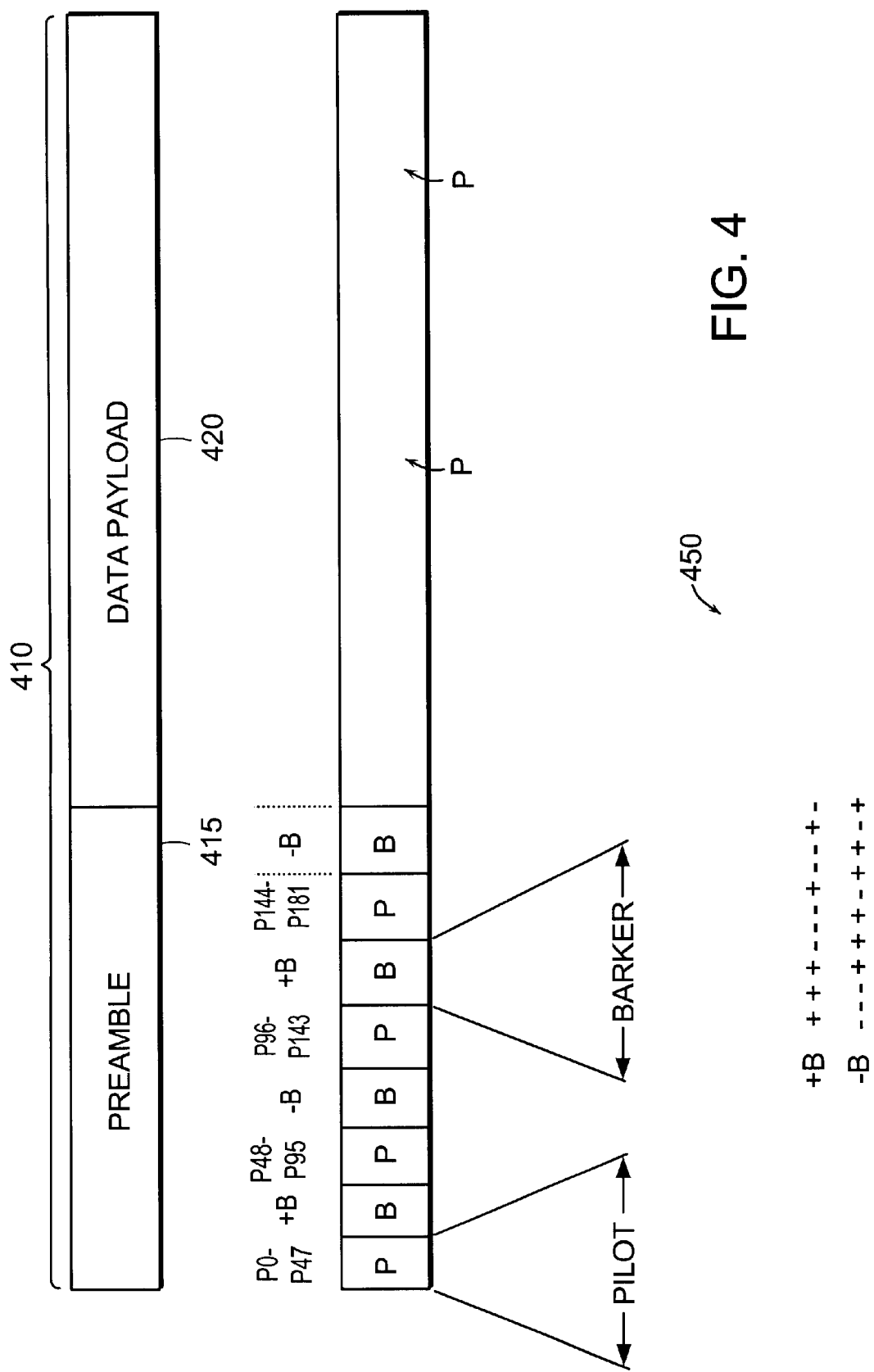
FIG. 4 is a pictorial diagram illustrating details of a message according to certain principles of the present invention.

FIG. 4 is a diagram illustrating a format for transmitting messages over the access channel from a field unit to a target receiver according to the principles of the present invention.

In one application, message 410 is transmitted by a field unit 14 over access channel 51 and includes two parts. As shown, a first part or preamble 415 of message 410 is a coded message indicating a request by the field unit 14 for a communication link. Each field unit 14 can transmit a message 410 having a commonly coded preamble 415. Thus, if two field units 14 transmit a message including the same preamble message 415, base station 20 can determine that at least a preamble message 415 was sent by at least one field unit 14. That is, the preamble message 415 as transmitted by one field unit can overlap with the preamble message 415 as transmitted by another field unit 14 when multiple messages 410 are transmitted in the same time slot.

Message 410 optionally includes a data payload 420 that is transmitted to base station 20. In one application, data payload 420 includes the serial number of the field unit 14 transmitting message 410. Typically, some form of redundancy check information such as CRC data is included with message 410 so that base station 20 can determine whether message 410 is properly received without errors.

If message 410 is received without errors, base station 20 can respond accordingly to establish a link with a field unit 14 and transmit a "non-collision" message on feedback channel 45 to the field units 14. Alternatively, if message 410 includes an error free preamble 415 but improperly received data payload information 420, base station 20 can deduce that two or more transmitters sent a message at the same time. A collision detection message is then transmitted over feedback channel 45 indicating that a collision occurred. Thus, a target receiver such as base station 20 monitoring messages 410 can provide valuable feedback to multiple transmitting field units 14 whether a message collision occurs.

Another aspect of the present invention involves coding a preamble 415 using pilot block 53 and Barker code block 54. Based on this coding or use of a sequence of symbols, a field unit 14 can transmit a message 410 to base station 20.

As shown, a preamble message 415 can include four pilot blocks 53 and four Barker code blocks 54. The Barker code blocks 54 assist base station 20 identify a point where preamble 415 of a message 410 starts. In other words, the information in the preamble 415 can be used for timing purposes at the base station 20 to asynchronously receive a message. Thus, it is not necessary that a field unit 14 transmit a message 410 in a time slot 210 because base station 20 can be modified to receive asynchronous messages.

However, in an application where messages 410 include Barker code blocks 54 that are transmitted in a time slot 210, base station 20 can identify a received message 410 even if a collision occurs because the preamble 415 of a message 410 simultaneously transmitted by multiple field units 14 in a time slot will overlap and, thus, will be detectable at base station 20.

Each pilot block 53 includes a number of repeating pilot symbols. Preferably, a pilot block includes 48 symbols that are used by a target receiver to decode message 410.

The second portion of a message 410 can include a data payload 420 that is sent to base station 20. Preferably, pilot symbols are also inserted in the data payload 420 portion of message 410 for assisting in coherent demodulation of data at a target receiver. Pilot symbols typically include a series of positive data bits and therefore do not themselves inherently include timing information.

A Barker code block 54 as shown includes a predetermined pattern of bit information. Use of BPSK (Binary Phase Shift Keying) can be used to generate a positive barker sequence 450, +B, such as three positive bits, followed by three negative bits, a positive bit, a pair of negative bits, a positive bit and then a negative bit respectively. A Barker code sequence can alternatively be negative such as a negative Barker sequence, −B, further assisting in message processing at a monitoring device.

Further details for processing message 410 including pilot blocks 53 and Barker code blocks 54 can be found in co-pending U.S. patent application Ser. No. 09/766,875 filed on Jan. 19, 2001 entitled "Access Channel Structure for Wireless Communication System," the entire teachings of which are incorporated herein by reference.

Figure 5:
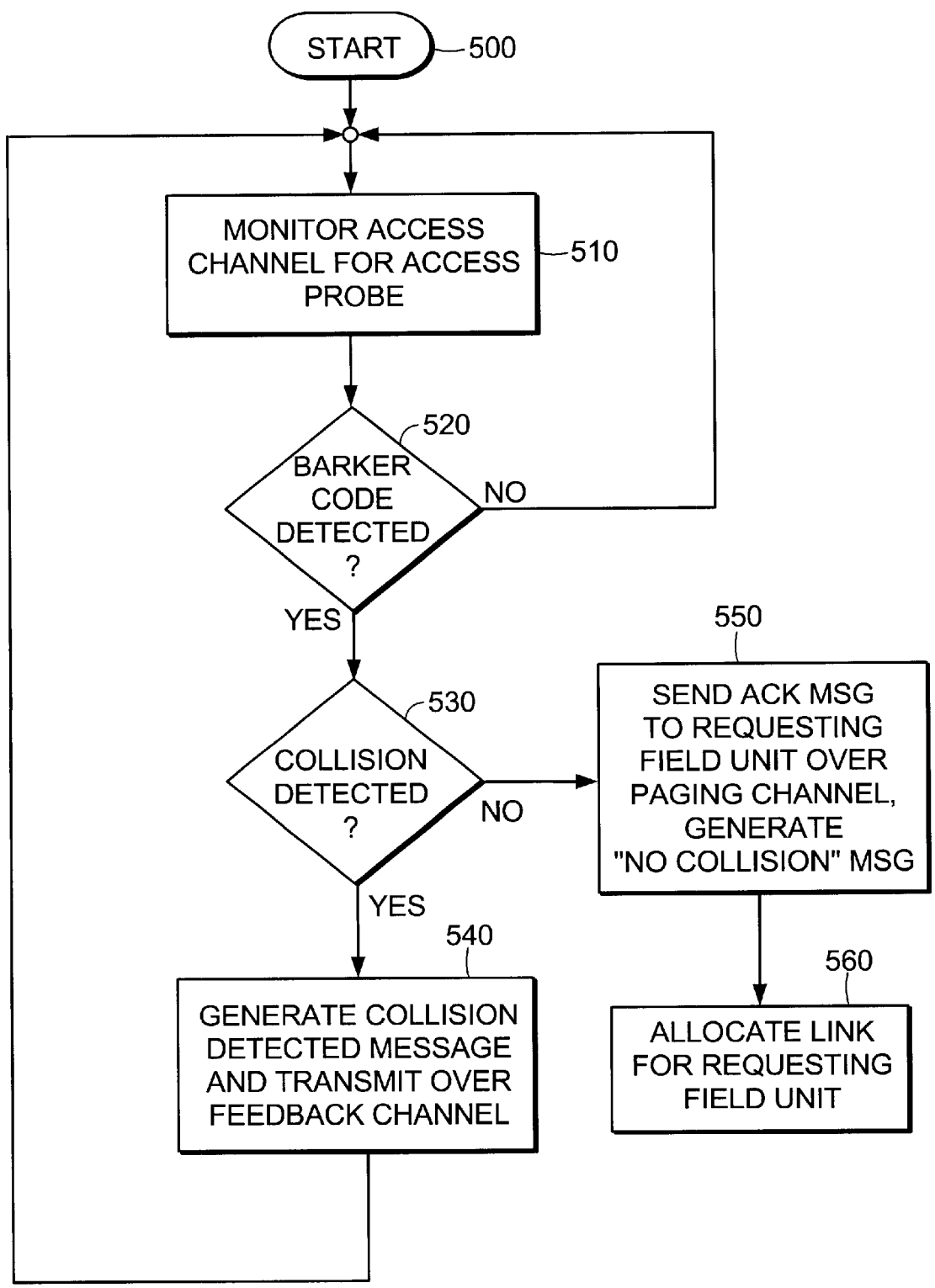
FIG. 5 is a flow chart for processing messages at a target receiver according to certain principles of the present invention.

FIG. 5 is a flow chart illustrating a process for monitoring a channel for messages according to the principles of the present invention.

Step 500 generally indicates an entry point into the flow chart. In step 510, an access channel 51 is monitored for message transmissions such as access request messages transmitted by a field unit 14. It is then determined in step 520 whether the message includes a Barker code or an appropriately received preamble 415 of a message 410. If no Barker code or preamble 415 is detected in step 520, process flow resumes at step 510 again. Alternatively, if a Barker code is detected in step 520, the message 410 is further analyzed to determine if a collision occurs in a time slot. That is, it is determined whether at least a portion of data in a received message 410 is corrupted.

One way to determine if a message collision occurs is to verify that data in a message 410 was properly received. This can be achieved by analyzing the received message 410 according to redundancy check information. If the data in a message 410 is not properly received at base station 20, a feedback message is transmitted by base station 20 over feedback channel 45 indicating that a collision was detected for a previous access request message in step 540. Following step 540, process flow resumes again at step 510.

If a collision is not detected for a particular message in step 530, the message 410 is analyzed to determine which of multiple field units 14 sent the message. Following in step 550, an ACK message 240 is sent to the requesting field unit 14 over the paging channel 41. Also, a message is sent over the feedback channel 45 indicating that no message collision occurred for the corresponding previous time slot 210 of access channel 51. Finally, a more formal link is established with the access requesting field unit in step 560.

Figure 6:
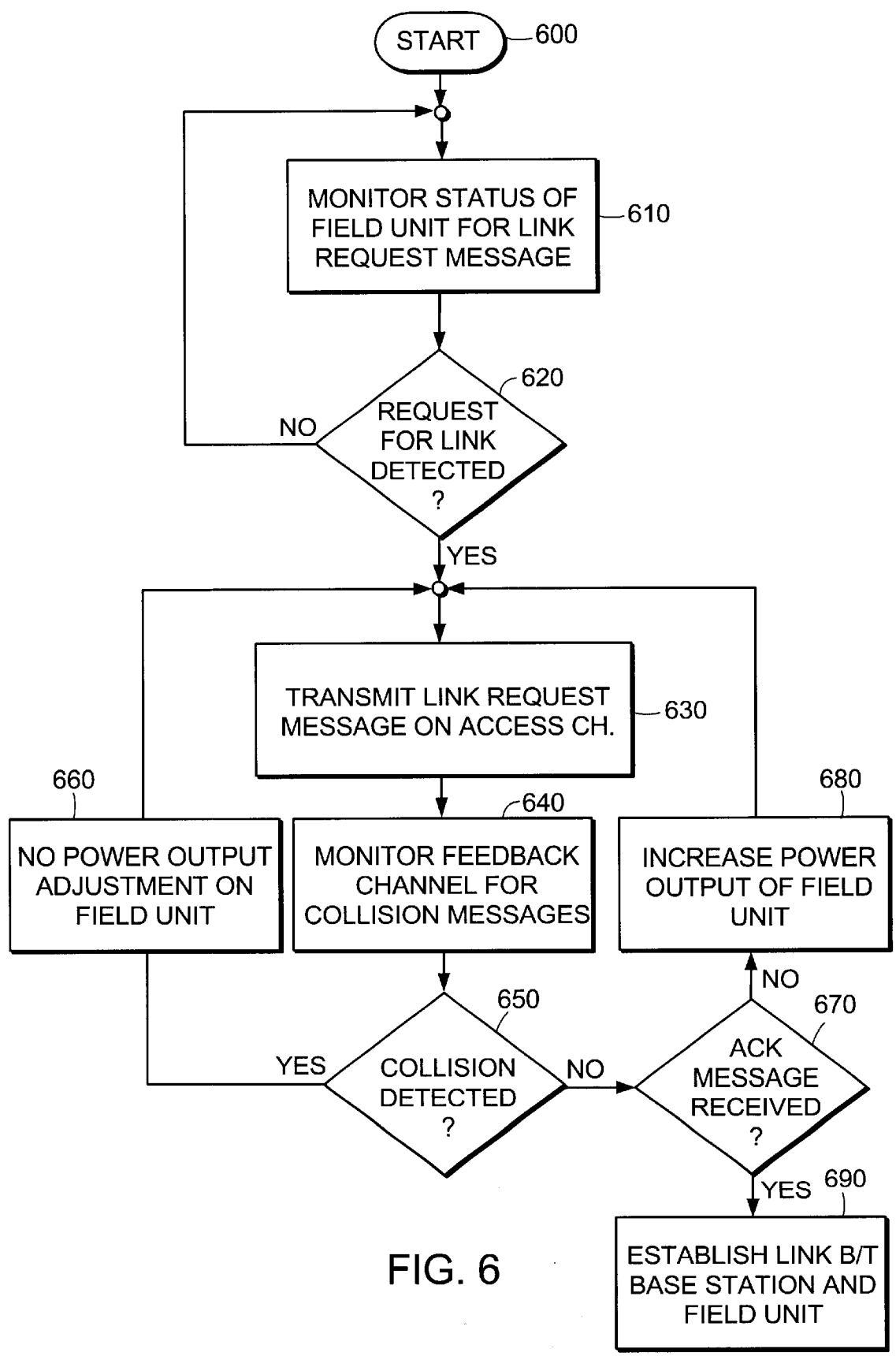
FIG. 6 is a flow chart for transmitting messages to a target receiver according to certain principles of the present invention.

FIG. 6 is a flow chart illustrating a process flow at a field unit for transmitting a message to a target receiver according to the principles of the present invention. Step 600 generally indicates an entry point into the flow chart.

In step 620, the status of field unit 14 is monitored for an input by a user indicating that the field unit 14 desires to establish a communication link with a target receiver such as base station 20. It is then determined in step 620 whether the input indicates that a field unit 14 desires to establish a communication link. If not, process flow again resumes at step 610. If so, field unit 14 transmits an access request message on the access channel 51 in step 630. Thereafter, the feedback channel 45 is monitored by a field unit 14 in step 640 for feedback information such as collision detection messages.

If a collision is detected for a previous transmission by a field unit 14 in step 650, process flow continues at step 660 where the power output level is not adjusted for the field unit 14 and a message 410 is subsequently re-transmitted in step 630.

If a collision is not detected in step 650 as indicated by a collision feedback message, it is determined in step 670 whether an ACK message 240 is received at the field unit 14 over paging channel 41. If so, a link is established between the field unit 14 and base station 20 in step 690. If not, the power output level of the field unit 14 is increased in step 680 and process flow continues at step 630 to re-transmit a message from the field unit 14 to base station 20.

Figure 7:
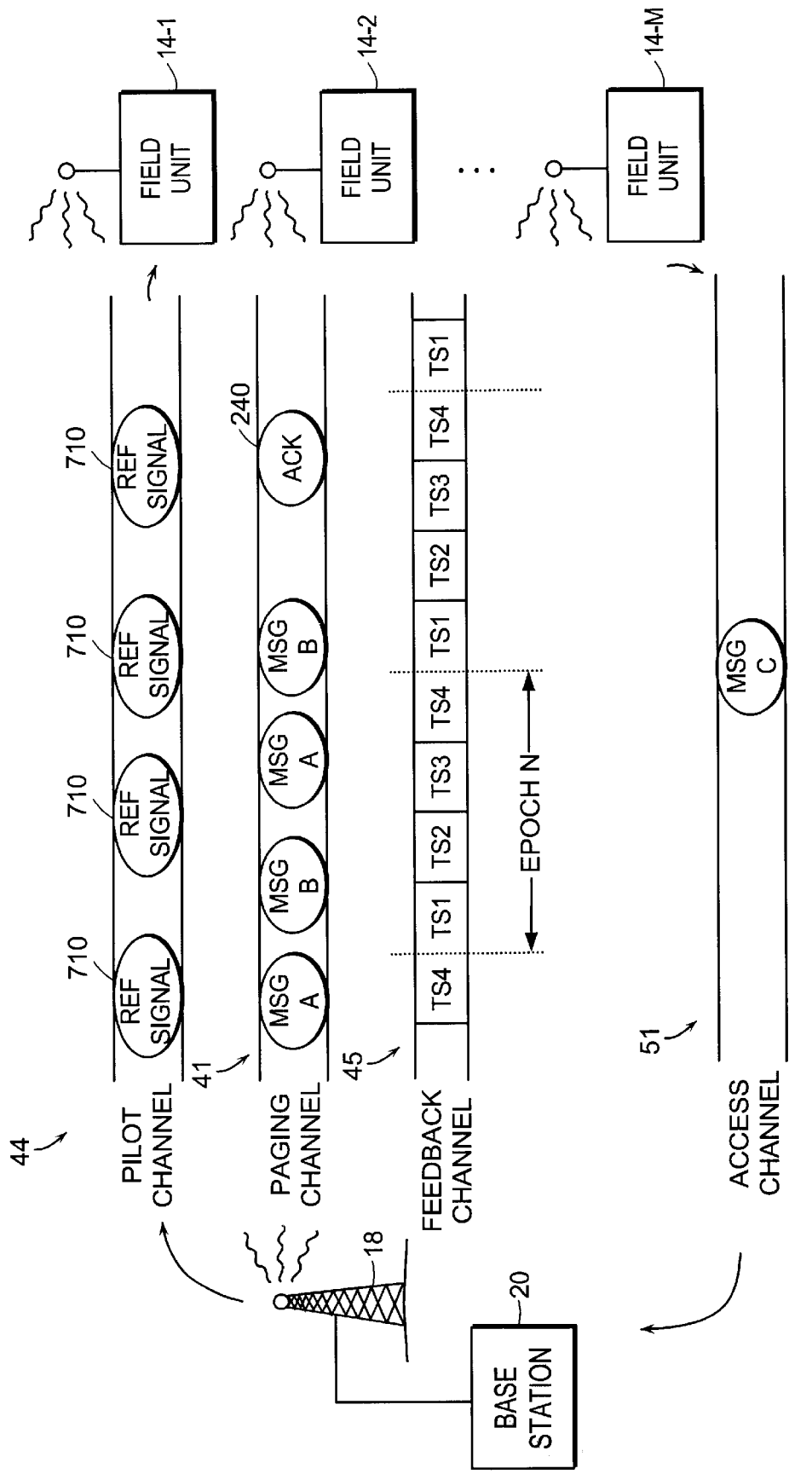
FIG. 7 is a timing diagram illustrating multiple channels on which messages are transmitted according to certain principles of the present invention.

FIG. 7 is a timing diagram illustrating multiple channels on which messages are transmitted among transceivers according to the principles of the present invention.

As previously discussed, one aspect of the present invention involves setting a field unit 14 to an initial power level so that it minimally interferes with other users during a message transmission. Since power is ramped up based on whether an access message is detected at base station 20, it is preferable that the initial power level of the field unit is reasonably near a power level at which base station 20 will receive a message at a desired power level. Consequently, a field unit 14 will be able to transmit a message to base station 20 and establish a more formal communication link in less time since a power level output of field unit 14 will need only minimal adjustments so that a message is received at base station 20.

One method for initially setting a power output level of a field unit 14 involves transmitting a reference signal 710 on pilot channel 44 from base station 20. Preferably, the reference signal 710 is transmitted at an appropriate power level so that multiple field units 14 in a wireless airspace monitoring the pilot channel 44 can identify the reference signal 710 and measure a power level at which it is received. In one application, reference signal includes pilot information such as a sequence of pilot symbols, where the pilot symbols are defined by PN (Pseudo Noise) codes. One or multiple pilot correlation filters in field unit 14 is used to detect the pilot symbols.

Each field unit 14 monitoring the pilot channel 44 typically includes a power detector circuit to measure a power level of the received reference signal 710. For example, the power detector is used to measure the strongest pilot path of the received reference signal 710. This measurement is used to estimate a forward path loss between base station 20 and field unit 14.

The total received signal power level of the reference signal 710 can be computed based on the sum of the magnitude squared of the I and Q channel. Power measurements are optionally filtered for providing a better estimate of a received power level under fading conditions.

As shown in FIG. 7, messages are transmitted on paging channel 41 from base station 20 to field units 14. One such message is message A that includes information indicating a power level at which reference signal 710 is transmitted from base station 20. This value can be expressed in dBm that already takes into account the gain of the base station antenna. Thus, message A can include effective radiated power level information at which base station 20 transmits reference signal 710. In harmony with the principles of the present invention, additional messages such as antenna gain information, offset information, correction information and general information can be transmitted to a field unit 14.

Field unit 14 decodes message A to determine a power level at which reference signal 710 is transmitted. The forward path loss between base station 20 and field unit 14 is then determined by comparing the received power level of the reference signal 710 at field unit 14 with the effective radiated power level as indicated by message A.

The calculated forward path loss can then be used to estimate a reverse path loss between field unit 14 and base station 20. For example, the reverse path loss is estimated to be about the same as the forward path loss, although it is probably at least slightly different. This estimated path loss is used to determine an initial setpoint at which messages can be transmitted from field unit 14 to base station 20.

Consider a case where base station 20 transmits a reference signal 710 at an effective radiated power level of 55 dBm. As discussed, this information is sent to field units 14 via message A generally broadcasted on the paging channel 41. If the received power level of the reference signal 710 is 22 dBm, the forward path loss is calculated as 55–22 dBm, or forward path loss=33 dBm. Based on this path loss, a field unit 14 can estimate a reasonable power output level for a subsequent attempt to transmit a message to base station 20.

Additional messages can be sent on paging channel 41 from base station 20 to field units 14. For example, message B is also generally transmitted to field units over paging channel 41. Message B preferably includes encoded information indicating a desired power level at which base station 20 will receive subsequent messages from a field unit 14. This information can also be a specific message directed transmitted to a particular field unit 14. Thus, a field unit 14 can use the information to estimate at what level a message should be transmitted so that a message is received at the desired power level. In a case where message B indicates a desired power level of 12 dBm and the forward path loss is approximately 33 dB as discussed, field unit 14 can attempt to transmit a message at 33+12 dBm, or 45 dBm, to base station 20.

Notably, the reverse path loss may be much more than 33 dBm as estimated. In such a situation, base station would not necessarily detect a message transmitted by field unit 14. As previously discussed, however, the power output setpoint of 45 dBm can be a starting point at which messages such as access request messages 750 are transmitted over access channel 51. If a collision is not detected at base station 20 and no ACK message 240 is received over paging channel 41, the power output of field unit 14 can be increased by 1 dBm to 46 dBm for a subsequent attempt to transmit a message. This procedure of adjusting the power output level of a field unit 14 can be repeated until a message is detected at base station 20.

Figure 8:
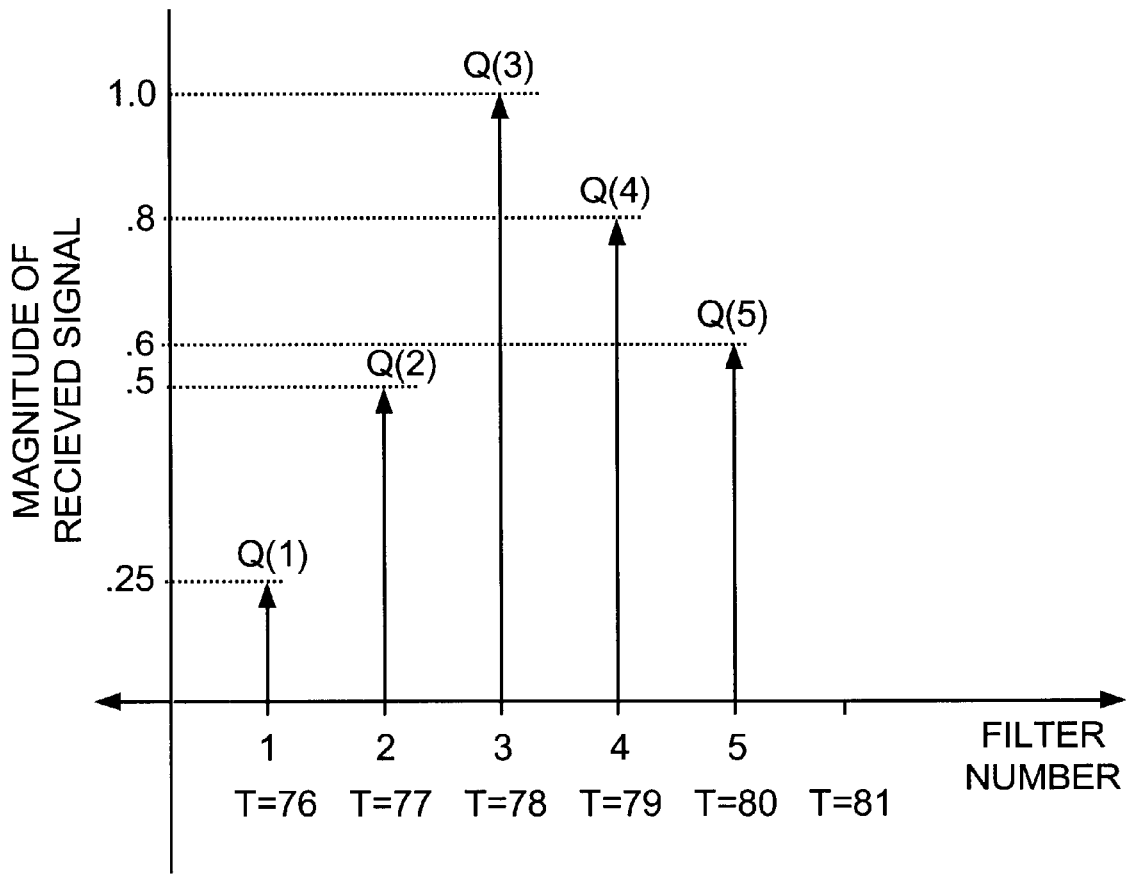
FIG. 8 is a diagram of a monitored reference signal according to certain principles of the present invention.

Messages transmitted to base station 20 can also be monitored to determine a power level at which a message is received from a field unit 14. To achieve this end, a message such as message C can include pilot information such as a pilot symbol or sequence of pilot symbols. Pilot correlation filters are then used to identify the strongest diversity path and side paths as shown in FIG. 8. One or multiple paths are then used to determine a power level at which the message is received at base station 20 on access channel 51. To ensure that a message C is properly received, the message is analyzed for errors using error detection information such as CRC check bits. These and other aspects of invention were previously discussed in this specification.

After message C is properly received at base station 20, a power adjustment message is generated at base station 20 to indicate how the field unit 14 should be adjusted so that subsequent messages to base station 20 are received at a desired power level. For example, if base station 20 determines that a message is received at 23 dBm, base station 20 can send a message over paging channel 41 indicating that the field unit should reduce its power output level for subsequent message transmissions so that a message from a field unit is received at a lower power level such as 12 dBm.

FIG. 8 is a graph illustrating a received diversity string for a pilot symbol according to the principles of the present invention. A received message such as reference signal 710, message A, message B or message C can include a marker such as one or multiple pilot symbols that are monitored at a receiver to determine a power level of a received message.

Both base station 20 and field units 14 include pilot correlation filters for identifying a marker such as one or multiple pilot symbols in a transmitted message. This marker aids in analyzing both timing alignment and a received power level of a message. Incidentally, the diversity string illustrates the receipt of a marker in a message as a result of multipath fading. That is, a signal from a transmitter is received at a target at different times due to varying times it takes for the signal to reach the target over different paths between a transmitter and receiver.

Preferably, the strongest received diversity path will be designated as the time alignment string at base station 20 field unit 14 for analyzing the timing of a received message. Likewise, the single strongest path is preferably chosen to calculate a power level at which a message is received. However, additional paths are optionally used to determine a received power level of a message.

Timing alignment and a received power level of a message is determined using the correlation profile of the strongest pilot in a particular string, which is analyzed as mentioned using correlation filters. The output of the correlation filters typically consist of 256 samples, which represent 64 lags at 4 samples per lag. The 256 sample output-window represents the total correlation time span of a receiver device. This can vary depending on the application. Preferably, the time alignment point is sample number 80 which allows 20 lags for precursor and 44 lags for post cursor channel information.

Generally, the computation of the time alignment error is based on a determination of where the centroid or peak lies in a given sample string. For example, each field unit 14 transmitting in a time slot includes a marker, i.e., the peak signal, located at a predetermined position within a time slot. The strongest pilot path for the channel and 2 samples on either side of the main path, i.e., 1 and ¼ chips, is statistically analyzed to determine the centroid or peak of a marker within a time slot. Location of the centroid, L, of the samples in FIG. 6 is calculated based on the following equation:

$$L = \frac{\sum [t \times Q(t)]}{\sum Q(t)}$$

where t=sample time and Q(t) is the magnitude of a sample at a given time.

For example, L is calculated based on the results as shown in FIG. 6:

$$L = \frac{(.25 * 76) + (.5 * 77) + (1.0 * 78) + (.8 * 79) + (.6 * 80)}{.25 + .5 + 1.0 + .8 + .6}$$

$$L = 78.317$$

Again, the timing alignment error is determined by comparing the timing of the computed centroid to the desired time set point of 80, which is chosen as the reference point for timing alignment within a time slot. Since the centroid in the example above is estimated to be 78.317, timing is early relative to the set point of 80. An appropriate message can be sent to field unit 14 indicating how its timing should be finely tuned so that messages from field unit 14 are received at the appropriate time at base station 20.

In a similar manner, the diversity string of FIG. 8 can be analyzed to determine a power level at which a message is received. Thus, an appropriate message can be sent to field unit 14 indicating how its power output level should be adjusted so that a message is received at a desired power level.

As mentioned, this technique can be used to detect a received power level of reference signal 710 at base station 20.

More details regarding timing alignment and power control between a base station 20 and each of multiple field units 14 can be found in co-pending U.S. Application No. (2479.1067-001) entitled "Minimal Maintenance Link to Support Synchronization" filed on Feb. 7, 2001, and co-pending U.S. application Ser. No. 09/775,305 entitled "Maintenance Link Using Active/Standby Request Channels" filed on Feb. 1, 2001, the entire teachings of both of which are incorporated herein by reference.

Figure 9:
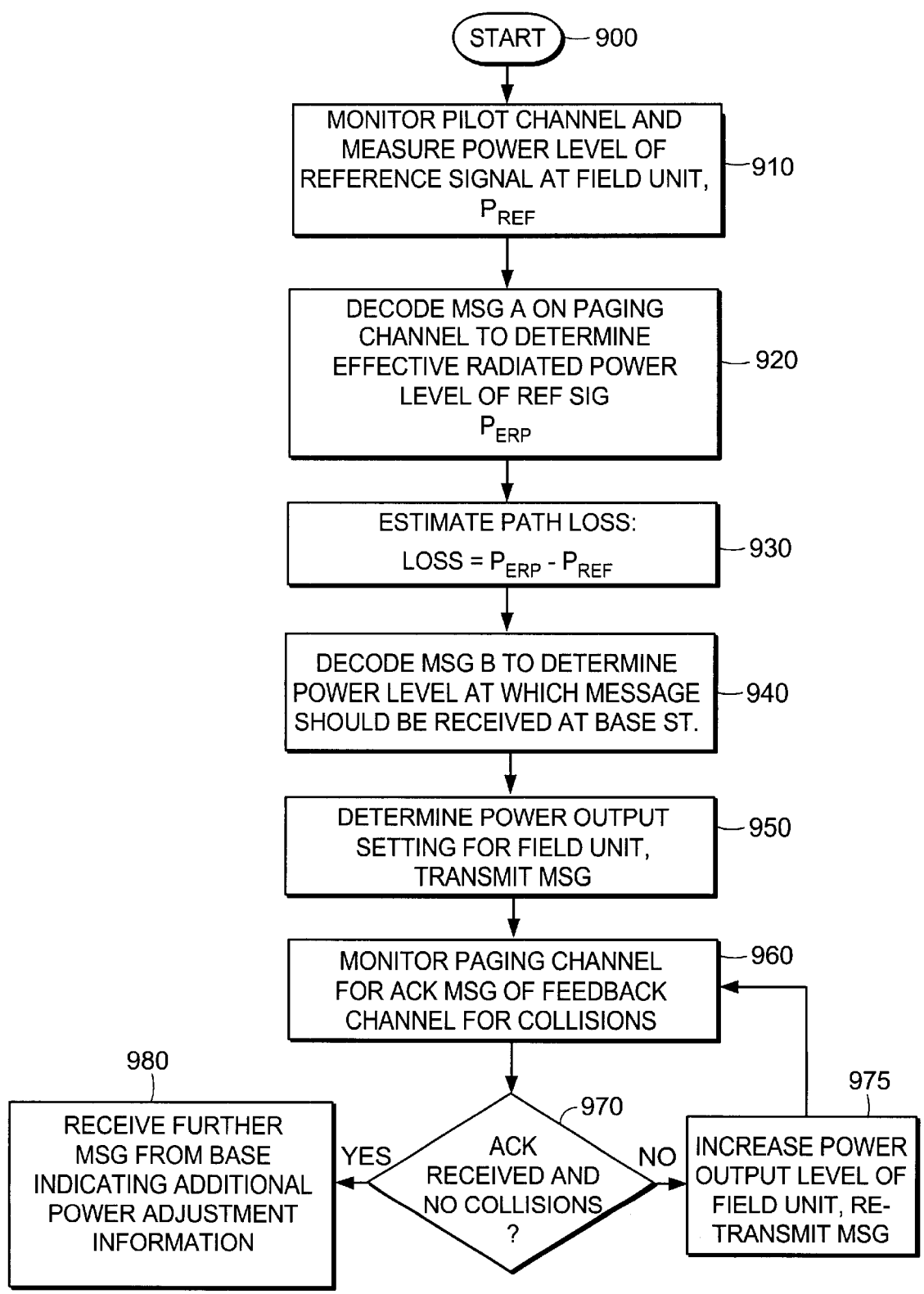
FIG. 9 is a flow chart for setting an initial power output level of a transmitter device according to certain principles of the present invention.

FIG. 9 is a flow chart illustrating a method for setting a power level output of a field unit based on an estimated path loss according to the principles of the present invention.

Step 900 indicates an entry point into the flow chart. Following in step 910, field unit 14 monitors pilot channel 44 for reference signals 710. As previously discussed, the field unit determines a power level at which reference signals 710 are received using a power detector circuit and pilot correlation filters.

In step 920, paging channel 41 is monitored by a field unit 14 for messages transmitted from base station 20. As previously discussed, message A is received on paging channel 41 and decoded to determine an effective radiated power level at which reference signals 710 are being transmitted from base station 20.

Based on the detected power level of reference signal 710 as received at field unit 14 and corresponding effective radiated power level at which the reference signal 710 is transmitted from base station 20, a path loss is estimated between the base station and field unit 14 in step 930. Preferably, the path loss is estimated by computing the difference between the power level at which reference signal 710 is transmitted from base station 20 and a power level at which reference signal 710 is received at field unit 14.

Message B is subsequently received at field unit 14 in step 940. This message preferably includes information indicating a desired power level at which messages are to be received at base station 20.

Based on the desired power level at which messages are to be received at base station 20 and the estimated path loss in step 930, field unit 14 determines a power output setting for field unit 14 so that a message is received at the desired power level at base station 20 in step 950. More specifically, it is presumed that an actual path loss from the field unit 14 to base station is approximately the same as the calculated path loss between the base station and field unit 14 based on measurements of reference signal 710. Thus, an appropriate power output level of field unit 14 can be determined by adding the estimated path loss to the desired power level setting to determine a power output setting for field unit 14. Consequently, this power output setting of a field unit 14 should be a reasonable starting point for attempting to transmit an initial message to base station 20.

Also in step 950, field unit 14 transmits message C such as an access request message to base station 20 over access channel 51. Upon receipt, base station 20 measures a received power level of message C at base station 20. This received power level is then compared to the desired power level so that feedback can be provided to field unit 14 indicating how to adjust its power output level so that subsequent messages are received at the desired power level.

Following in step 960, field unit 14 monitors paging channel 41 for an ACK message indicating that base station 20 properly received message C. If an ACK is not received in step 970, the power output level of a field unit 14 is increased in step 975 and the message is subsequently re-transmitted in step 960. This loop of increasing power generally repeats until base station 20 acknowledges receipt of the message.

When an ACK is received in step 970, process flow continues at step 980 in which additional messages are received from base station 20 indicating whether the message transmitted in step 950 was received at the desired power level. As discussed, information can be transmitted to a field unit 14 indicating how to adjust its power output level so that subsequent messages are received at the desired power level at base station 20. Consequently, the output power level of the field unit 14 is adjusted accordingly for subsequent message transmissions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for supporting wireless communications, the method comprising the steps of:

from at least two field units, transmitting a message on a first channel to a base station, a message transmitted by each field unit including a common sequence of binary coded information that is detectable at a base station if multiple field units simultaneously transmit a message on the first channel;

monitoring the first channel to detect a collision occurring when two or more field units attempt to send a message; and notifying the field units of a message collision on the first channel by transmitting information from the base station to the field units over a second channel to indicate that a collision occurred.

2. A method as in claim 1 further comprising the steps of:

adjusting a power level output of a field unit requesting access depending on whether a message collision is detected at the base station.

3. A method as in claim 1, wherein a field unit synchronizes with the base station prior to transmitting an access request message.

4. A method as in claim 3, wherein a field unit transmits an access request message in a time slot of the first channel, the base station subsequently notifying the field units of message collisions by transmitting a message in a time slot of the second channel.

5. A method as in claim 1, wherein an access request message transmitted by an access requesting field unit includes the common sequence of binary coded information that is detectable at the base station even if multiple field units simultaneously transmit an access request message on the first channel.

6. A method as in claim 1, wherein an access request message transmitted to the base station on the first channel includes information indicating from which field unit the access request message is transmitted.

7. A method as in claim 1, further comprising the step of:

from the base station, transmitting an acknowledgment message to an access requesting field unit if no message collision is detected on the first channel, the acknowledgment message indicating that a communication link will be established with the field unit.

8. A method as in claim 7, wherein the acknowledgment message is transmitted to an access requesting field unit over a paging channel of a CDMA (Code Division Multiple Access) communication system.

9. A method as in claim 1 further comprising the step of:

adjusting a power output level of the access requesting field unit to a higher level if the base station does not acknowledge receipt of the access request message.

10. A method as in claim 1 further comprising the step of:

adjusting a power output level of the access requesting field unit by a predetermined amount for a subsequently transmitted access request message if the base station does not acknowledge receipt of a previously transmitted access request message.

11. A method as in claim 1, wherein the communication link includes a feedback loop for synchronizing the field unit to the base station when no data payload is being transmitted from the field unit to the base station.

12. A method as in claim 1, wherein the first channel is an access channel of a CDMA (Code Division Multiple Access) communication system.

13. A method as in claim 1 further comprising the step of:
re-transmitting an access request message from a field unit when a collision is detected at the base station.

14. A method as in claim 13, wherein the field unit monitors the second channel to determine whether there was a collision of a previously transmitted access request message on the first channel.

15. A method as in claim 14, wherein the field unit re-transmits a subsequent access request message based on a random back-off time on the first channel when a collision is detected for a previously transmitted access request message.

16. A method as in claim 1, wherein the second channel is time slotted so that the field units can monitor selected fields of information transmitted by the base station indicating whether a collision was detected on the first channel.

17. A method as in claim 16, wherein the information is a single bit indicating whether a collision was detected on the first channel.

18. A method as in claim 1, wherein the second channel is shared and time slotted in which messages are transmitted from the base station to a the field units in assigned time slots.

19. A method as in claim 18, wherein a portion of each of multiple time slots is reserved for feedback information from the base station indicating whether a collision was detected at the base station.

20. A method as in claim 1 further comprising the steps of:
at an access requesting field unit, adjusting a power output of an access requesting field unit to a higher level for subsequent transmissions when a previously transmitted access request message is not detected at the base station; and
tracking at what power level the base station acknowledges receipt of then access request message on the first channel.

21. A method as in claim 20, wherein a power level at which the base station acknowledges receipt of an access request message is used as a basis for determining a power level to be used for transmitting subsequent information from the access requesting field unit to the base station.

22. A method as in claim 1 further comprising the step of:
subsequently transmitting an access request message from a field unit without increasing a power output level when a collision is detected at the base station.

23. A method as in claim 1 further comprising the step of:
transmitting a message from each of two or more transmitters on the first channel, one part of each message including a common encoded sequence that overlaps during transmission so that a transceiver device monitoring the first channel can identify a message was transmitted by the two or more transmitters even when a collision occurs.

24. A method as in claim 23, wherein the common encoded sequence identifies a specific message type that was simultaneously transmitted by the two or more transmitters.

25. A method as in claim 1 further comprising the step of:
dividing the first channel into time slots in which each of the multiple transmitters may attempt to send a message.

26. A method for supporting wireless communications, the method comprising the steps of:
detecting that a collision occurs when two or more transmitters attempt to send messages over a first channel, a collision occurring when each of the two or more transmitters transmit messages on the first channel;
notifying the transmitters of a collision on the first channel by sending a message to the transmitters over a feedback channel;
adjusting a power output level of a corresponding transmitter attempting to send a message over the first channel depending on whether a collision occurs on the first channel;
wherein at least a portion of each message transmitted in a time slot overlap, a common encoded sequence of the messages being detectable at a receiver even though there is a collision.

27. A method as in claim 26, wherein a power level at which a target receiver acknowledges receipt of a message is used as a basis for determining a power level to be used for transmitting subsequent information from the transmitter to the target receiver.

28. A method as in claim 26 further comprising the step of:
subsequently attempting to send a message over the first channel without increasing a power output level of a corresponding transmitter when a collision is detected.

29. A method for supporting wireless communications, the method comprising the steps of:
detecting that a collision occurs when two or more transmitters attempt to send messages over a first channel, a collision occurring when each of the two or more transmitters transmit messages on the first channel;
notifying the transmitters of a collision on the first channel by sending a message to the transmitters over a feedback channel;
adjusting a power output level of a corresponding transmitter attempting to send a message over the first channel depending on whether a collision occurs on the first channel;
wherein a target receiver to which a corresponding message is sent over the first channel sends a feedback message over the shared channel to the transmitters indicating whether a collision occurs on the first channel, the feedback message being sent in a second time slot that is delayed a predetermined amount from a first time slot in which messages are received on the first channel.

30. A method for supporting wireless communications, the method comprising the steps of:
allocating a first channel on which multiple transmitters may attempt to send a message;
dividing the first channel into time slots in which each of the multiple transmitters may attempt to send a message; and
transmitting from each of two or more transmitters a message in a time slot, one part of each message including a common encoded sequence that overlaps during transmission in a time slot so that a device monitoring the first channel can identify a common message type transmission by the two or more transmitters.

31. A method as in claim 30, wherein a second part of each message is unique to a corresponding transmitter.

32. A method as in claim 30, wherein the device monitoring the first channel identifies a collision based upon whether a second part of a message is properly received.

33. A method as in claim 30, wherein redundancy check information is included in a second part of the message for determining whether a message is properly received without a collision.

34. A method as in claim 30, wherein a message transmitted by a transmitter indicates a request by the corresponding transmitter for a bi-directional communication link.

35. A method as in claim 30, wherein a second part of each message includes information indicating from which transmitter a corresponding message is transmitted.

36. A method as in claim 30, wherein a second channel is provided to send feedback messages to the transmitters indicating whether a message collision occurs.

* * * * *